United States Patent [19]

Johnson et al.

[11] Patent Number: 4,502,767
[45] Date of Patent: Mar. 5, 1985

[54] METHOD AND APPARATUS FOR BLOCKING DIRECT AMBIENT FROM STRIKING SELF-DEVELOPING FILM UNIT

[75] Inventors: Bruce K. Johnson, Andover; Charles W. Triggs, Marshfield, both of Mass.

[73] Assignee: Polaroid Corporation, Cambridge, Mass.

[21] Appl. No.: 453,877

[22] Filed: Dec. 27, 1982

[51] Int. Cl.³ .............................................. G03B 17/52
[52] U.S. Cl. ...................................................... 354/86
[58] Field of Search ................................ 354/83–86, 354/150

[56] References Cited

U.S. PATENT DOCUMENTS

| | | | |
|---|---|---|---|
| 3,369,470 | 2/1968 | Downey | 95/13 |
| 3,405,619 | 10/1968 | Land | 95/13 |
| 3,415,644 | 12/1968 | Land | 96/3 |
| 3,437,023 | 4/1969 | Downey et al. | 95/13 |
| 3,446,131 | 5/1969 | Cook et al. | 95/13 |
| 3,682,068 | 8/1972 | Stieger et al. | 95/39 |
| 3,702,580 | 11/1972 | Erlichman | 95/13 |
| 3,810,211 | 5/1974 | Wareham et al. | 354/86 |
| 3,940,774 | 2/1976 | Ivester | 354/83 |
| 4,005,446 | 1/1977 | Friedman | 354/86 |
| 4,072,968 | 2/1978 | Land et al. | 354/86 |
| 4,109,263 | 8/1978 | Johnson | 354/150 |
| 4,199,240 | 4/1980 | Norris | 354/86 |
| 4,372,660 | 2/1983 | Hara et al. | 354/86 X |

*Primary Examiner*—John Gonzales
*Attorney, Agent, or Firm*—Leslie J. Payne

[57] ABSTRACT

A camera apparatus is disclosed for exposing photographic film of the self-developing type and for then processing a film unit to initiate formation of a visible image therein as it exits from the camera. The film unit is a relatively flat, flexible unit having on one side of the unit a light transmissive major surface and on an opposite side of the unit an opaque major surface. The apparatus includes structure located on the housing in adjoining relation to a housing exit slot for directing each exiting film unit along an exterior portion of the housing with the light transmissive surface maintained close to and facing the housing portion so that the light transmissive surface is blocked from direct exposure to the ambient light.

10 Claims, 4 Drawing Figures

METHOD AND APPARATUS FOR BLOCKING DIRECT AMBIENT FROM STRIKING SELF-DEVELOPING FILM UNIT

BACKGROUND OF THE INVENTION

The present invention relates to the field of photography and, in particular, to improvements in photographic apparatus of the self-developing type.

Photographic apparatus of the self-developing type are generally well known. Typically, these include a camera body having a film pack containing a stacked array of film units which are located adjacent a pair of pressure-applying rollers. The rollers are mounted adjacent a camera body exit slot through which an exposed film unit is advanced after being exposed. For advancing the film unit from the pack after exposure, there is provided a film pick arrangement which advances the topmost film unit of the film pack through a film pack exit slot. The film unit is brought into engagement with the rollers, and it is then further advanced by them while they simultaneously and progressively cause uniform spreading of the processing fluid in the film unit.

Earlier types of self-developing cameras were provided with a chamber for receiving at least a portion of the film unit as it was advanced from the rollers. The chambers served several purposes, one of which was to prevent further exposure of a treated film to ambient light. Use of these chambers, however, added to the overall dimensions of the camera. This was a disadvantage because it lessened the ability to devise an even more compact camera of the instant type.

Lately, there has been disclosed film units of the self-developing type which can be advanced into ambient light substantially immediately after the processing composition has been spread across at least a predetermined length of the film unit. Examples of such film units are described in commonly-assigned U.S. Pat. No. 3,415,644. With these film units at least a leading portion of the film unit can be advanced into ambient, while yet untreated portions can remain within the camera. By virtue of the ability to be advanced into ambient without the need for an exposure chamber it will be appreciated that compactness of the camera is enhanced.

The foregoing arrangement while serving satisfactorily, however, is nonetheless subject to potential drawbacks. One is the phenomenon generally referred to as lightpiping. More particularly, lightpiping arises when ambient light, which is actinic to the photosensitive layer in the film unit, is incident upon any portion of the transparent material exiting the camera during the film processing operation. Such ambient light is transferred down the transparent sheet and can extend past the processing rollers into the exposure chamber such that the unprocessed or untreated sections of the exposed photosensitive layer are struck by such radiation. This will result in the untreated sections fogging.

Several solutions for solving the problem of lightpiping have been put forth. One includes the use of an opacifying pigment in the light transparent layer itself. This solves the lightpiping problem without materially diminishing the quality of the finished photographic print. However, it should be recognized that it is also highly desirable to minimize light resistant characteristics of the film unit's transparent layer.

Another approach for overcoming the lightpiping problem is disclosed in commonly-assigned U.S. Pat. Nos. 3,940,774; 4,005,446; and 4,072,968. Essentially, these patents disclose the use of an opaque shade which covers the transparent layer of the film unit as the latter exits the camera. The shade is defined by a coil of opaque material mounted adjacent the camera exit in such a position and manner that the film unit's leading edge engages it and causes it to progressively uncoil while the film progressively exits the slot. The coil, as it uncoils, progressively covers portions of the film unit's light transmitting layer which have been treated with the processing composition. Hence, this prevents the ambient light which is actinic to the photosensitive layer from being reflected along the transparent layer to the untreated portions of the film unit. While the use of opaque shades of the type described above perform satisfactorily, there nonetheless exists the fact that such shades must be adequately stored adjacent the exit slot of the camera. Because of the coil's size and of the desire to protect its fragile physical strength from damage the camera housing must be made to accommodate it. By accommodating the opaque shade in such a manner the camera cannot be made as compact as possible. Moreover, such shades and their assembly into the camera add to overall manufacturing costs.

SUMMARY OF THE INVENTION

In accordance with the present invention, there is provided an improved photographic apparatus of the instant type which solves the lightpiping problem in a manner which enhances compactness of the camera.

In accordance with the present invention, a provision is made for a camera apparatus for exposing photographic film of the self-developing type and for then processing a film unit to initiate formation of a visible image therein as it exits from the camera. The film unit is a relatively flat, flexible unit having on one side of the unit a light transmissive major surface and on an opposite side of the unit an opaque major surface. Included in the apparatus is a camera housing having an exposure chamber, and an exit slot for advancing each exposed film unit from the housing. For processing each unit to initiate formation of a visible image therein there is provided means for doing so and for advancing each film unit through the exit slot prior to completion of such image. Located on the housing is means in adjoining relation to the exit slot for directing each exiting film unit along a portion of the housing with the light transmissive surface maintained close to and facing the housing portion so that the light transmissive surface is blocked from direct exposure to the ambient light.

In accordance with a preferred embodiment, there is provided a photographic apparatus of the type for use in exposing and developing film units of the kind defined by superposed outer layers having a photosensitive material therebetween. One of the layers is opaque and the other transmissive to light so as to allow scene radiation to impinge upon the photosensitive material. Each film unit includes a pod of processing fluid mounted adjacent the leading edge which is arranged to have its fluid spread across the photosensitive material as pressure is applied progressively to each unit from its leading to its trailing edges. Included in the apparatus is means for defining a camera housing having an internal exposure chamber. Means are provided for directing scene radiation to a film plane in the exposure chamber. Included in such apparatus are means for receiving and locating a stacked array of the film units in the housing such that successive topmost ones of the film units are positioned at the film plane. The receiving means and locating means includes a slot for allowing the successive topmost film units to be advanced therefrom. A pair of juxtaposed fluid spreading members are provided and form an elongated pressure generating gap between them. These members are positioned adjacent the slot so as to receive the leading edge of the uppermost film units after exposure. The members are operable to progressively apply a pressure to each of the film units as they are advanced therethrough. Means are operable for advancing each of the topmost ones of the film units from the receiving and locating means to the gap. An elongated film exit in the camera housing is defined. The film exit is positioned adjacent the gap so as to direct the film units advanced by the rollers to the outside of the camera housing along a given path. In an illustrated embodiment, there is means formed on the camera housing for directing the film units exiting the film exit in such a manner that the film units are redirected to travel along an exterior surface portion of the camera such that the light transmissive layer travels is blocked from direct exposure to the ambient light.

Preferably, this blocking occurs until substantially all portions of the exposed photosensitive material are covered by the processing fluid.

In another preferred embodiment, the directing means includes a pair of spaced apart and generally opaque guiding rails being positioned adjacent the exit slot. The rails are sized and configured to engage opposite lateral edge portions of each of the exiting film units as well as to substantially block ambient light coming from the sides of the film unit entering the space between the exterior surface of the camera and the transmissive surface striking the transparent layer.

In another preferred embodiment, the receiving and locating means, the rollers and the exit slot are arranged such that an extension of the given path, the film unit would normally take, intersects an optical axis formed by the scene radiation directing means. This allows formation of an even more compact camera arrangement.

Among the other objects and features of the present invention is the provision for an improved photographic apparatus of the type using self-developing type film wherein the apparatus includes means for minimizing or eliminating the impact of lightpiping on the exiting film unit; the provision of an improved apparatus of the above type which eliminates need for an opaque shade; the provision of an improved photographic apparatus of the above type wherein the film unit exiting the camera has its path redirected in such a fashion that the opaque side of the film unit faces away from the camera, while the transmissive portion of the film unit faces towards the camera; the provision of an improved apparatus of the above type having light blocking structure which blocks ambient light from entering the space between the transmissive layer and the camera's exterior surface; the provision of an improved apparatus of the above type having directing means mounted adjacent the film exit slot and being arranged and adapted to engage the longitudinal edges of the film unit so as to direct the latter in such a fashion that the noted orientation of the film unit vis-a-vis the exterior camera body is achieved.

Other objects and further scope of applicability of the present invention will become apparent from the detailed description to follow when taken in conjunction with the accompanying drawings in which like parts are designated by like reference numerals.

DETAILED DESCRIPTION

Figure 1:
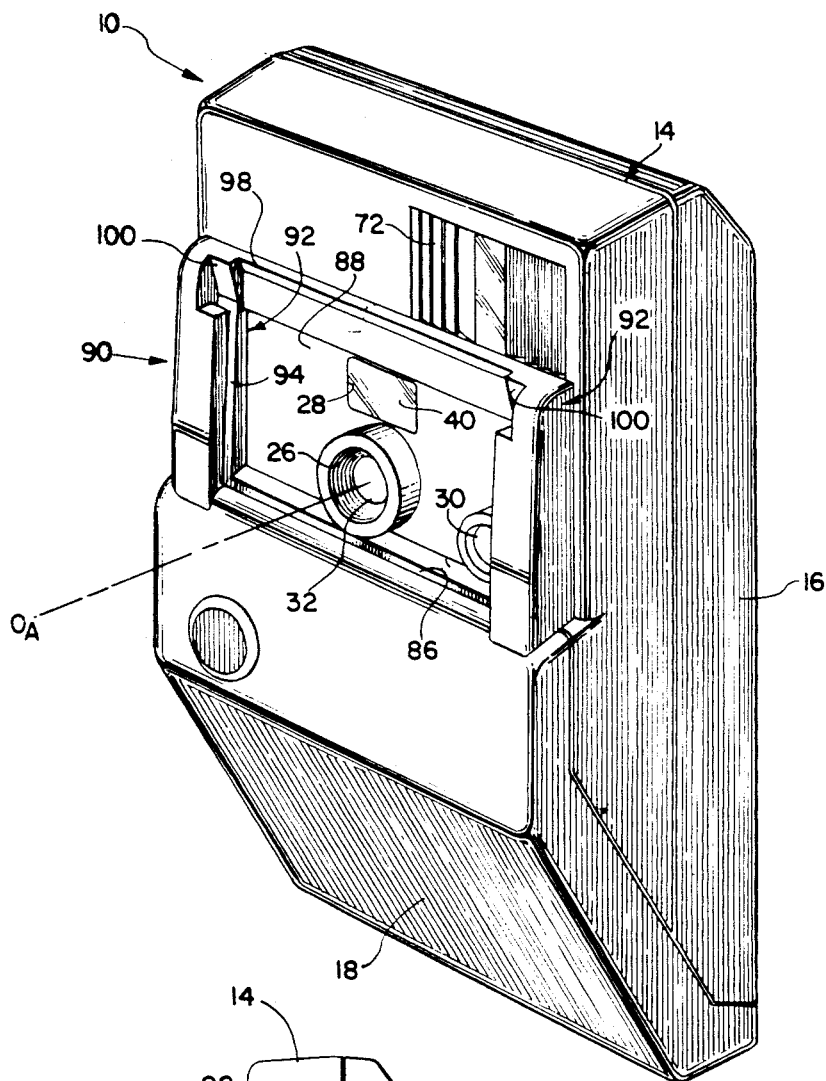
FIG. 1 is a perspective view of a compact photographic apparatus made in accordance with the present invention.
Figure 4:
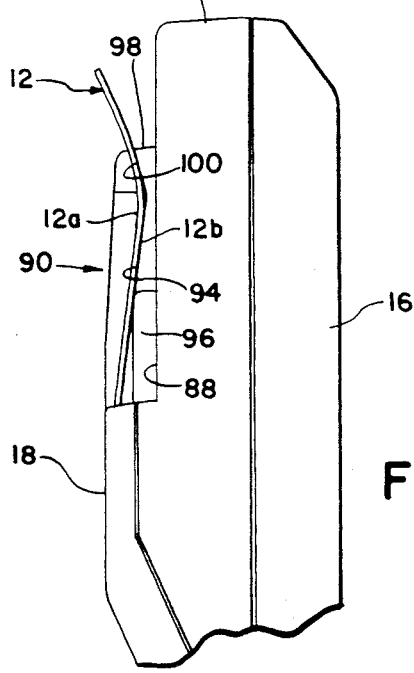

Reference is made to FIGS. 1 to 4 for purposes of illustrating the improved photographic apparatus of the present invention indicated generally by reference numeral 10. This particular photographic apparatus 10 is of the type used for exposing and initiating the processing of self-developing type film of the so-called integral-positive, self-processable type 12. Essentially, each film unit 12 includes an opaque surface or layer 12a having opposite thereto a light transmissive layer or surface 12b. Interposed between the layers is a photosensitive material 12c which is actinic to ambient scene radiation. Formed at the leading edge of the film unit 12 is a pod processing fluid 12d which is ruptured in a manner to be described. The fluid is spread uniformly across the unit so as to initiate processing of the latent image. The film unit is of the type which can be advanced into ambient light after the processing fluid has been spread thereacross.

Figure 2:
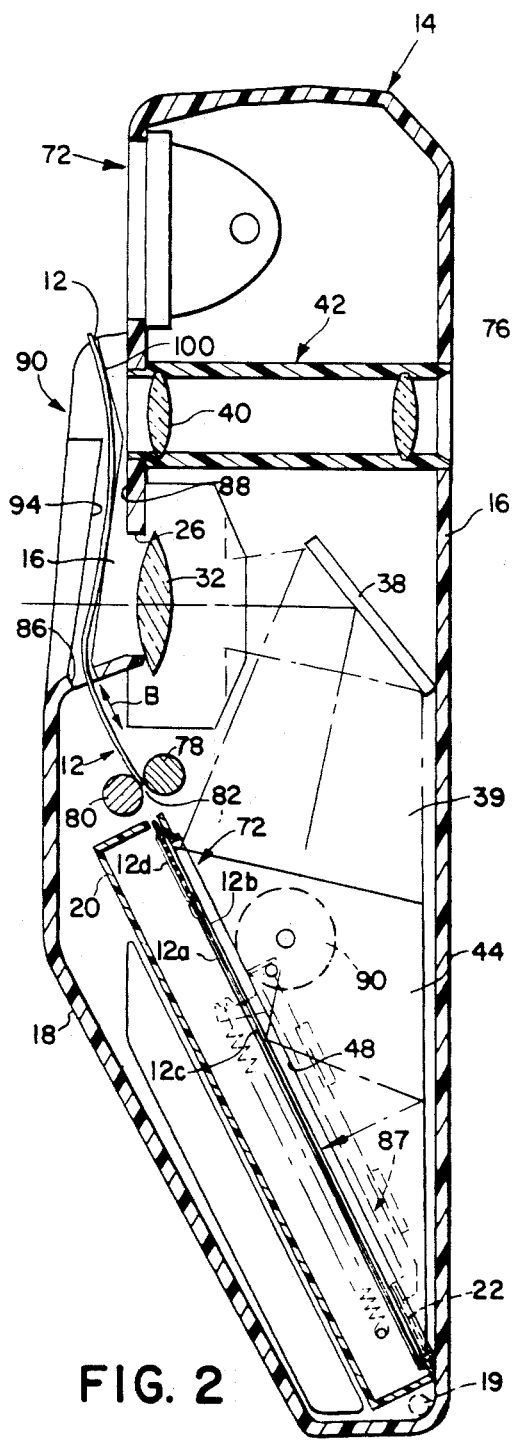
FIG. 2 is a cross-sectional, side elevational view of the photographic apparatus of the present invention.

As best shown in FIG. 2, the photographic apparatus 10 includes a camera body 14 comprising a main housing section 16 and a pivotal loading door section 18. The door 18 is pivoted as at 19 to the bottom of the main housing 16. The loading door section 18 is movable between the closed position shown in the drawings and an open position not shown. When the loading door section 18 is in the open position, a film cassette or pack 20 may be slidably received by a film pack receiving structure (not shown) mounted on the loading door section 18. Access to the interior of the photographic camera apparatus 10 can be obtained by releasing a releasing latch button (not shown) formed on the side of the body 14. Details of the film pack 20 do not, per se, form a portion of the present invention. Hence, only those parts thereof considered necessary for a proper understanding of this invention will be set forth. For greater detail of such a film pack, however, reference may be made to commonly-assigned U.S. Pat. No. 3,872,487. The film pack 20 has a generally rectangular shaped aperture 22 formed therein. The film pack aperture 22 defines the field of view of the subject which will be recorded on the photosensitive material during exposure. Each of the film units 12, only one of which is shown, is mounted in a stacked array within the film pack 20, so that successive ones of the units 12 are brought into proper registration with the rectangular aperture 22, whereby the transparent layer 12b is located at the focal plane. This is done by means of a biasing spring, not shown, located within the pack. Beneath the film pack 20 is a thin battery which is electrically coupled, in a well-known manner, to the various electrical components of the camera.

Formed on the front vertical wall portion of the main housing section 16 are a number of apertures designated generally at 26, 28, 30. Mounted in registration with a taking lens aperture 26 is an objective or taking lens 32 which is arranged along the optical axis $O_A$. The lens 32 is positioned forwardly of an aperture in an opaque exposure chamber 36 formed by the body 14. Located in this exposure chamber 36 is a generally trapezoidal shaped reflecting mirror 38. The mirror 38 is arranged at a predetermined angle with respect to the film plane and optical axis $O_A$. Essentially, the mirror 38 facilitates formation of a folded light path between the image forming scene rays being directed by the taking lens 32 and the uppermost one of the film units 12. Mounted in registration with the viewfinder aperture 28 is a negative lens 40 which forms part of a reversed Galilean viewfinder 42. This viewfinder 42 is structured in a well-known manner and has a field of view coextensive substantially with that of the taking lens 32 for assisting in aiming and framing of the camera. Adjacent the taking lens 32 is the window 30 which is aligned with respect to a photocell assembly (not shown).

Interposed between the uppermost film unit 12 and the reflecting mirror 38 is a prism element 44. The prism element 44 further folds the optical path of the useful light rays, between the mirror 38 and the film plane, within a highly compact area. The prism 44 has an entrance face 46 which is in light-receiving optical alignment with the taking lens 32 and the mirror 38. The entrance face 46 is also optically aligned with an exit face 48, the latter of which is in juxtaposed overlying relationship to the film plane. Since the prism 44 does not, per se, form an aspect of the present invention, the details of its structure and function will not be set forth. However, for a more detailed explanation of the construction and functioning of the prism in such a photographic apparatus, reference is made to commonly-assigned U.S. Pat. No. 4,109,263.

Figure 3:
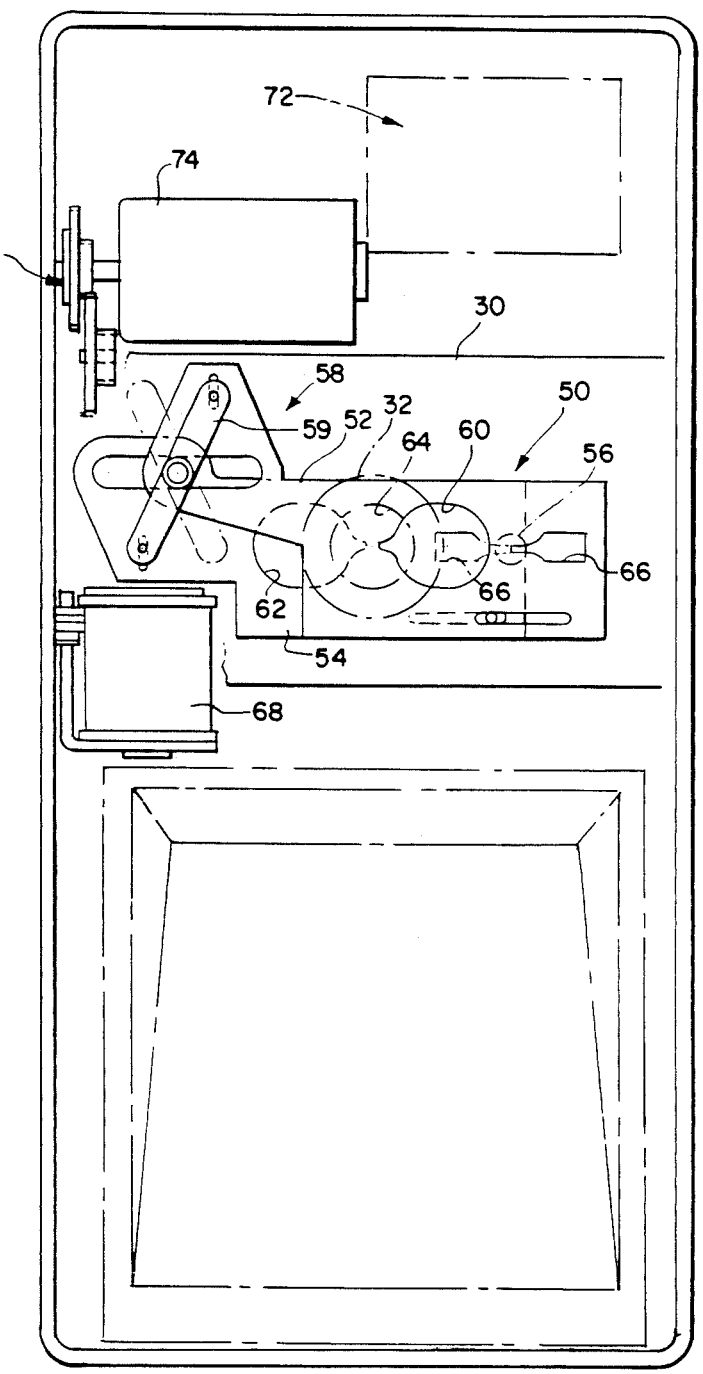
FIG. 3 is a front elevational view of the photographic apparatus shown in FIG. 2, but, however, certain parts are omitted for purposes of clarity; and, FIG. 4 is a fragmented side elevational view with structure omitted for clarity in demonstrating the present invention.

As best shown in FIG. 3, the photographic apparatus 10 includes a blade mechanism 50 which is comprised of a pair of overlapping, opaque scanning-type shutter blades 52, 54. The blades 52, 54 are interposed between the taking lens 32 and the mirror 38 for controlling the scene radiation that will be incident upon the film plane as well as for controlling the scene radiation incident upon a light sensing and evaluating system generally indicated by reference numeral 56. Since details of the blade mechanism 50 and the light sensing and evaluating system 56 do not, per se, form an aspect of the present invention, only a brief description thereof will be presently set forth. For a more detailed description of such mechanism and system, reference is made to commonly-assigned U.S. Pat. No. 4,040,072. Each of the blades 52, 54 is connected to a common pivoting walking beam mechanism generally indicated by reference numeral 58 which includes a walking beam 59. The shutter blades 52, 54 are supported for scanning type reciprocatory movement on and by the baseblock casting 30 so as to be positioned intermediate the lens arrangement 32 and the mirror 38.

Formed in the scanning shutter blades 52, 54 is a pair of taking or scene light admitting primary apertures 60, 62; respectively. During blade scanning movement, the taking apertures 60, 62 coincide in overlapping relationship with respect to both a light exposure opening 64 and the lens arrangement 32 to define progressively increasing taking aperture areas as a function of blade positioning. In this embodiment, the taking apertures 60, 62 define a time-variable exposure aperture area. For greater details regarding the construction of various scanning shutter programs for the taking apertures 60, 62, reference is made to U.S. Pat. No. 4,188,103.

Also formed in the shutter blades 52, 54 is a set or corresponding pairs of secondary or photocell sweep apertures indicated generally by reference numeral 66. The corresponding and overlapping set of photocell apertures 66 define a plurality of small, effective photocell aperture areas for controlling the passage of scene radiation to the light sensing and evaluating system 56. The light sensing and evaluating system 56 includes a photocell (not shown) of the silicon photodiode type. The photocell cooperates with a light integrating circuit, not shown, in a well-known manner for energizing a solenoid assembly 68 for terminating the exposure interval of the shutter blades 52, 54, as a function of the time integration of scene radiation intensity incident on the photocell. The amount and character of scene radiation incident on the photocell is controlled primarily by photocell sweep apertures 66.

The walking beam 59 is attached to the solenoid assembly 68 mounted in the housing section 16. When the solenoid assembly 68 is energized, it drives the blades to the blocking position illustrated in FIG. 2. When the solenoid assembly 68 is deenergized, a biasing spring (not shown) serves to drive the blades 52, 54 to their unblocking position. Normally, the blades 52, 54 are held in blocking position against the bias of the spring. This is accomplished by means of a well-known mechanical shutter latching device (not shown), but described in the last-noted patent. One difference between the arrangement of the shutter blades 52, 54 and the solenoid assembly 68 is the fact that their working axes are oriented at 90° with respect to each other. This is opposed to the linear arrangement shown in the last-noted patent. Such change in arrangement is done for purposes of providing for a more compact structure. However, the operation of the shutter blades is as described in the previously-noted patent.

Reference is again made to FIGS. 1–3 for showing an electronic strobe or flash arrangement indicated generally by reference numeral 72. For purposes of the present invention the electronic strobe unit 72 is integrally formed so as to be part of the main housing assembly 16. Since construction and operation of the strobe unit 72 do not, per se, form an aspect of the present invention, it too will not be discussed in depth insofar as it does not form an aspect of the present invention. The operation of a similar strobe unit 72 is described in recently issued and commonly-assigned U.S. Pat. No. 4,351,593.

Also, located in the upper portion of the main housing 16 is a motor 74 and a gear train assembly 76, only a part of which is shown, for driving the processing rollers 78 and 80 in a well-known manner. The processing rollers 78, 80 are supported in the housing and are spaced apart by a predetermined gap 82 which gap facilitates formation of the desired processing fluid thickness.

Thus, when the topmost film unit 12 is being advanced from the film pack 20, it is advanced through a slot 84 which is positioned adjacent the rollers. The leading edge of the film unit is advanced into the nip of the rollers 78, 80. The rollers 78, 80 then feed the exposed film unit 12 forwardly to first rupture the pod 12d and then spread uniformly the processing fluid across the photosensitive material 12c. The film unit 12 is thereafter advanced along a given path B to a camera housing exit slot 86.

For advancing the uppermost film unit 12, there is provided a film pick mechanism generally indicated by reference numeral 87 which is supported for movement adjacent the film pack 20. The pick 87 is linearly driven by a projection on a pick wheel 90 the latter of which is supported in the housing and driven by the motor 74 through the gear train 76. The operation of such a pick arrangement for linearly advancing the film unit after every exposure is well-known. Thus, a detailed description of such an operation has been dispensed with.

The pressure rollers 78, 80 will, as indicated, serve to provide progressive pressure on the film unit 12 as it is advanced from the film pack 20.

The camera exit slot 86 is oriented with respect to the camera body 14 so that the exiting film unit 12 is ejected such that its leading edge is generally parallel and spaced apart with respect to the exterior surface 88 of the main housing 16. Stated somewhat differently, the film unit 12 exits in such that its opaque layer 12a, when brought outside, will face away from the camera 10 while the light transmissive layer 12b faces the main housing 16.

Reference is now made to the guiding means 90 of the present invention. Basically, the guiding means 90 substantially eliminates the lightpiping problem mentioned earlier. It will be noted that the loading door 18 includes a pair of guiding and light blocking rails 92 which are generally vertical disposed and spaced apart with respect to each other by a distance sufficient to accommodate therebetween the film unit 12. Each of the rails 92 includes an inwardly facing channel 94 extending along the longitudinal extent thereof. These channels 94 are sized and configured for receiving the longitudinal margins or edge portions of the film units 12 as they exit the slot 80. The channels 94 are so arranged that as the film unit 12 is advanced outwardly from the exit slot 86 the leading edge portion of the film unit 12 is turned so that the noted transparent layer 12b faces the exterior surfaces 88 of the main housing 16. The rails 92 are made of opaque material and serve to prevent ambient light from entering the space 96 between the transmissive layer 12b and the exterior surface 88 while the film unit is being advanced. Further towards the end of restricting undesired ambient light from striking the transmissive layer, the camera body 14 is provided with a light baffle 98 at the top end thereof. The light baffle 98 is so constructed and arranged that ambient light entering from the top of the camera 10 will be greatly restricted from entering the space 96 along the transmissive layer to the unprocessed film unit within the film pack. The terminal ends of the guide rails 92 are provided with ramps 100 which force the film units 12 outwardly from the camera body (FIG. 2). This facilitates a user gripping the same for removal from the camera.

In this embodiment, indirect ambient light from the viewfinder might strike the transparent layer 12b. But such light will normally be insufficient in intensity and amount to create any significant lightpiping problems. It is contemplated by the present invention that there be a viewfinder shade (not shown) which would block the passage of light in the viewfinder 42 in response to the advancing film unit striking a biased lever (not shown) protruding from the exterior surface 88. In this latter type of arrangement the shade would travel to the unblocking position once the film unit no longer urged the lever against its bias. Also, the viewfinder could be located vertically higher than from the position presently depicted so that any ambient light traveling through the viewfinder would not strike the transmissive layer 12b.

The foregoing relationship between camera and film unit provides, in effect, an imbibition chamber for adequately protecting the transmissive layer from significant portions of direct ambient light, which if otherwise were unblocked would directly impinge upon the transparent layer. Thus, ambient light would be reflected internally beyond the pressure rollers 78, 80 into the untreated portion of the film unit. Accordingly, the lightpiping problem would exist.

It will be appreciated, of course, that the foregoing construction of the noted embodiment is simple, but effective in preventing or substantially reducing lightpiping. In addition, the noted arrangement is inexpensive insofar as there are no requirements for an opaque shade or chamber for receiving the processed film unit. In contrast to the prior art, the present invention does not use additional chambers, but the camera body 14 itself because the exiting film 12 is redirected from the intended exiting direction along the camera exterior surface 88 such that the transparent layer 12b faces this exterior surface.

It will be appreciated that many modifications may be made in conjunction with the present invention. The foregoing illustrated embodiment is but one form. For instance, the film unit could exit rearwardly of the camera body and then be redirected so that the transmissive layer thereof would face the back of the camera body. It will be appreciated that in this latter case the film unit could be urged against the body so that ambient light will not strike the transmissive surface.

Since certain changes may be made in the above-described apparatus without departing from the scope of the invention herein involved, it is intended that all matter contained in the description or shown in the accompanying drawings shall be interpreted as illustrative and not in a limiting sense.

What is claimed is:

1. A camera apparatus for exposing photographic film of the self-developing type and for then processing a film unit to initiate formation of a visible image therein as it exits from the camera, the film unit being a relatively flat, flexible unit having on one side of the unit a light transmissive major surface and on the opposite side of the unit an opaque major surface, said apparatus comprising:

a camera housing including an exposure chamber, and an exit slot for allowing exiting of each exposed film unit from the housing;

means for processing each unit to initiate formation of a visible image therein and for advancing each film unit through said exit slot along a first path prior to completion of such image formation; and means located on said housing in adjoining relation to said exit slot for redirecting and guiding each exiting film unit from the first path to a second path, at an angle to the first path, which is along an exterior portion of the housing so that the light transmissive surface is maintained close to and facing said exterior housing portion so that the light transmissive surface is blocked from direct exposure to the ambient light.

2. The apparatus of claim 1 wherein said redirecting and guiding means includes a pair of spaced apart guide rails of relatively opaque material extending from a point adjacent said exit slot in the general direction of film advancement along the second path, said guide rails being configured to engage and guide opposite lateral edge portions of each of the film units along said exterior portion as the film unit is advanced through said exit so as to block transmission of ambient light at said lateral sides of the film unit.

3. The apparatus of claim 2 wherein said housing portion includes a light baffle mounted transverse to said rails so as to block ambient light from the leading end of the film unit.

4. The apparatus of claim 2 wherein the distal end of each rail redirects the leading end of the film unit away from said housing to facilitate removal of the film unit following completion of said processing.

5. A method of exposing photographic film of the self-developing type in a camera and for then processing a film unit to initiate formation of a visible image therein as it exits from the camera, the film unit being a relatively flat, flexible unit having on one side of the unit a light transmissive major surface and on an opposite side of the unit an opaque major surface, said method comprising:
    exposing at least a selected portion of the film unit within an exposure chamber of a camera housing, the housing including an exit slot for allowing exiting of each film unit from the housing;
    processing each unit to initiate formation of a visible image therein and advancing each film unit along a first path through the exit slot prior to completion of such image; and
    redirecting each exiting film unit from the first path to a second path at an angle to the first path which is along an exterior portion of the camera housing while maintaining the light transmissive surface of each film unit close to and facing the exterior housing portion so that the light transmissive surface is blocked from direct exposure to the ambient light.

6. Photographic apparatus of the type for use in exposing and initiating developing of film units of the self-developable type each one of which includes a pair of generally flat and flexible superposed layers of material having a photosensitive material therebetween, one of the layers being opaque and the other being light transmissive, each of the film units including a pod of processing fluid mounted adjacent its leading edge and arranged to have the fluid thereof spread across the photosensitive material as pressure is applied progressively to each unit from its leading to its trailing edges, said apparatus comprising:
    means for defining a camera housing having an internal exposure chamber,
    means for directing scene radiation to a film plane in said exposure chamber and for controlling exposure to the plane;
    means for receiving and locating a stacked array of said film units in said housing such that successive topmost ones of the film units are positioned at the focal plane, said receiving means and locating means includes a slot which allows the successive topmost film units to be advanced therefrom;
    a pair of juxtaposed fluid spreading members that form an elongated pressure generating gap between them, said members being positioned adjacent said slot so as to receive the leading edge of the uppermost film units after exposure and being operable to progressively apply a pressure to each of the film units as they are advanced therethrough;
    means operable for advancing each of the topmost ones of the film units from said receiving and locating means to said gap;
    means for defining an elongated film exit in the camera housing, said film exit being positioned adjacent said gap so as to direct the film units advanced by said members to the outside of said camera housing along a given path; and
    means on the exterior of said camera housing for directing the film units exiting said film exit in such a manner that the film units are redirected along a second path away from said given path so as to travel along said exterior surface whereby the transmissive layer travels in facing relationship to said exterior surface while the opaque layer faces away from the camera until substantially all portions of the photosensitive material are covered by the processing fluid, so that ambient radiation is blocked from the transmissive layer as the film unit travels along at least a portion of said exterior surface until the processing fluid substantially covers the photosensitive layer.

7. The apparatus of claim 6 wherein said directing means includes a pair of spaced apart and generally opaque guiding rails being positioned adjacent said exit slot and being sized and configured to engage opposite lateral edge portions of each of the exiting film units as well as to substantially block direct ambient light entering from the sides of the film unit and striking the transmissive layer.

8. The apparatus of claim 7 wherein a light baffle is on said exterior surface and extends between said rails and is constructed and arranged so that the amount of direct ambient radiation which might enter between the leading edge of the advancing film unit and said exterior surface is minimized.

9. The apparatus of claim 8 wherein ramp means are provided on said rails for redirecting the leading edge of the film unit away from said exterior surface so as to facilitate a user withdrawing the film unit from said directing means.

10. The apparatus of claim 6 wherein said receiving and locating means, said rollers and said exit slot are arranged such that an extension of said given path intersects an optical axis formed by said scene radiation directing means.

* * * * *